United States Patent [19]

Yamauchi et al.

[11] Patent Number: 4,949,283
[45] Date of Patent: Aug. 14, 1990

[54] MANUALLY SWEEPABLE PRINTING APPARATUS

[75] Inventors: Kazuki Yamauchi, Tachikawa; Atsushi Sagisaka, Hino; Nobuyuki Mochinaga, Kunitachi, all of Japan

[73] Assignee: Casio Computer Co., Ltd., Tokyo, Japan

[21] Appl. No.: 452,244

[22] Filed: Dec. 15, 1989

[30] Foreign Application Priority Data

Dec. 28, 1988 [JP] Japan ............................ 63-171585[U]
Mar. 29, 1989 [JP] Japan ............................... 1-35970[U]
Jul. 28, 1989 [JP] Japan .................................. 1-195651

[51] Int. Cl.⁵ ............................................. G06F 15/00
[52] U.S. Cl. ....................................... 364/519; 346/143
[58] Field of Search ................ 364/518, 519; 400/88, 400/193, 120 HH; 346/143

[56] References Cited

U.S. PATENT DOCUMENTS 3,767,020 10/1973 Rowe ................................. 346/143
4,699,052 10/1987 Lemelson ............................ 400/88

*Primary Examiner*—Arthur G. Evans
*Attorney, Agent, or Firm*—Frishauf, Holtz, Goodman & Woodward

[57] ABSTRACT

A manually sweepable printer stores data transferred from a data forming apparatus such as a wordprocessor in a memory. The printer is placed on printing paper and manually swept to sequentially print the data stored in the memory. The manually sweepable printer separately receives printing data and print control data from the data forming apparatus and separately stores the received data. In the printing operation, the printing data is printed on the basis of the print control data.

18 Claims, 13 Drawing Sheets

MANUALLY SWEEPABLE PRINTING APPARATUS

BACKGROUND OF THE INVENTION

1. Field of the Invention

The present invention relates to a manually sweepable printing apparatus for obtaining sub-sweeping by placing and moving an apparatus main body on a recording paper, and printing data formed by, e.g., a wordprocessor.

2. Description of the Related Art

In recent years, a manually sweepable printer has been put into practical use as an auxiliary apparatus of a wordprocessor and the like.

This manually sweepable printer can be manually swept across printing paper to perform printing. Therefore, the manually sweepable printer can perform printing on, e.g., a bound notebook or a plate-like member which cannot be printed by an ordinary printer.

Since, however, a conventional manually sweepable printer is normally coupled to a data forming apparatus such as a wordprocessor via a cable, it can be used in only a location close to the data forming apparatus. In addition, the cable prevents smooth manual sweeping.

SUMMARY OF THE INVENTION

The present invention has been made in consideration of the above situation and has as its object to provide a manually sweepable printer which can be used in a location remote from an installation place of a data forming apparatus, can smoothly perform sweeping, and can be easily operated.

In order to achieve the above object of the present invention, there is provided a printing apparatus which prints data received from a peripheral apparatus, the printing apparatus comprising:

housing means which is manually sweepable across a printing medium;

coupling means for detachably coupling with the peripheral apparatus;

data receiving means provided in the housing means, for receiving data from the peripheral apparatus via the coupling means;

memory means provided in the housing means, for storing the data received by the receiving means;

printing means carried by the housing, for printing the data stored in the memory means on the printing medium positioned outside of the housing means, when the housing means is manually swept across the printing medium;

position-detecting means for detecting a position of the printing medium as the housing means is manually swept across the printing medium, and for producing position-detecting signals every time the housing means is swept over a predetermined distance, the position-detecting signals responding the position of the housing means with respect to the printing medium; and control means provided in the housing means, for outputting the data from the memory means and for causing the printing means to print the data output from the memory means on the printing printing medium in response to the position-detecting signals output from the position-detecting means.

The printing apparatus of the present invention having the above arrangement can smoothly perform sweeping upon printing, and can be freely carried to a location at which an operator wants to use the apparatus to perform printing.

DETAILED DESCRIPTION OF THE PREFERRED EMBODIMENTS

Embodiments of the present invention will be described below with reference to the accompanying drawings.

Figure 1:
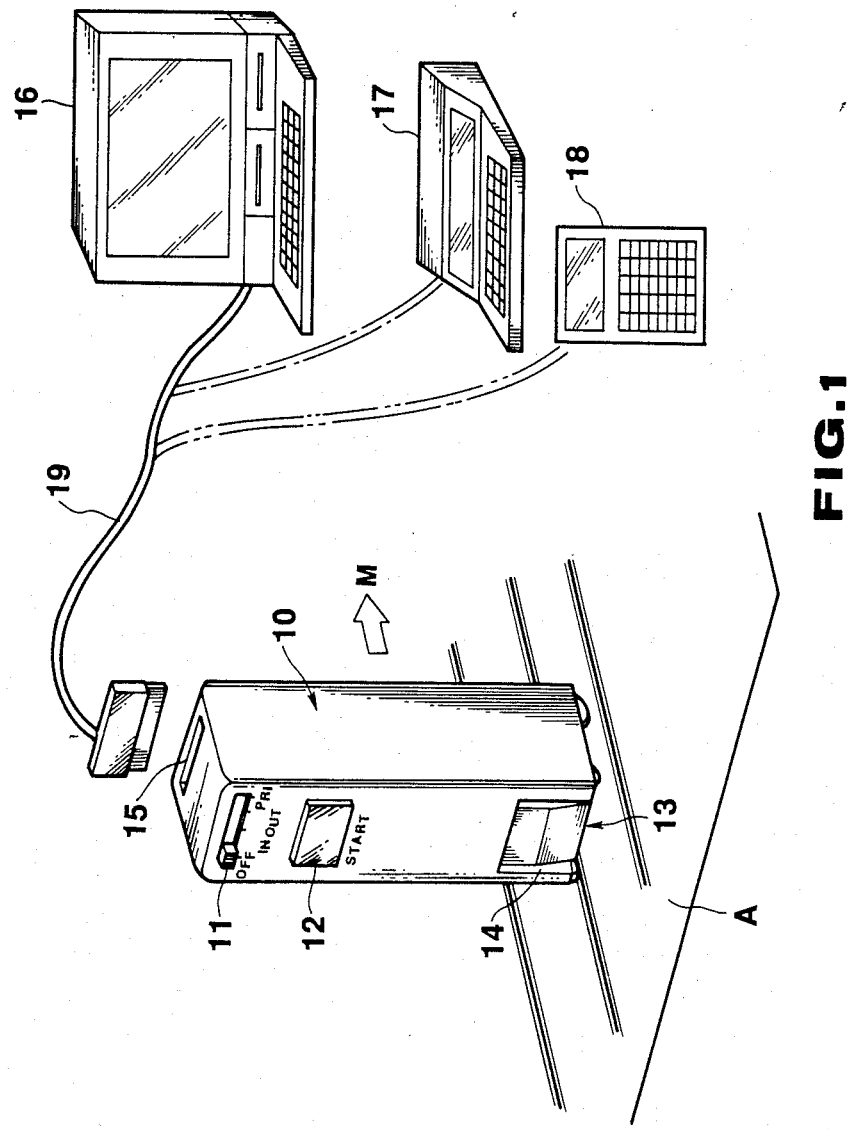
FIG. 1 is a perspective view showing an outer appearance of a data processing system according to the first embodiment of the present invention.

FIG. 1 shows a system arrangement of the first embodiment of the present invention.

A manually sweepable printer 10 shown in FIG. 1 is formed into a size which can be held by a hand of a user. The printer 10 is manually moved across a printing paper (e.g., plain paper or plastic) A in a direction indicated by arrow M to perform printing on the paper A.

The printer 10 has a mode switch 11 and a print start key 12 on the rear side surface with respect to its moving direction.

The switch 11 performs switching between power source ON/OFF, a data input mode IN, a data output mode OUT, and a print mode PRI. When the switch 11 designates any of the data input mode IN, the data output mode OUT, and the print mode PRI, a power source is switched on.

The key 12 is for designating a print operation. In the print mode, an operator moves the printer 10 while depressing the key 12, thereby performing the print operation on the paper A.

A printing section 13 (to be described in detail later) is provided at a lower end portion of the printer 10 so that the section 13 is brought into contact with the paper A when the printer 10 is placed on the paper A. A check window 14 is formed in a lower portion of the rear side surface with respect to the moving direction of the printer 10 so that whether the section 13 is brought into contact with the paper A can be checked.

A connector section 15 is formed in the upper surface of the printer 10. The section 15 is connected to a coupling cord 19 for coupling the printer 10 with an electronic apparatus such as a personal computer 16, a wordprocessor 17, or an electronic notebook 18.

Figure 2:
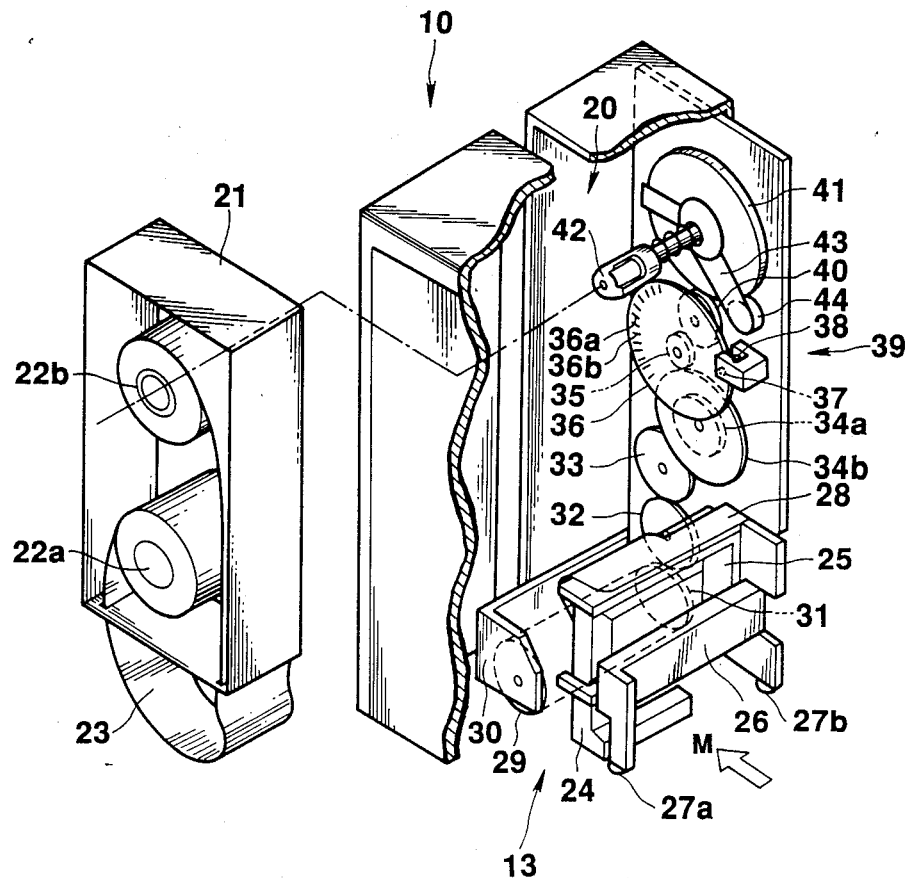
FIG. 2 is an exploded perspective view showing an internal arrangement of a manually sweepable printer showing FIG. 1.

FIG. 2 shows an arrangement of a print mechanism section 20 arranged in the printer 10.

Referring to FIG. 2, an ink ribbon cassette 21 is made compact so as to be detachably mounted on the mechanism section 20 with high precision. The cassette 21 has two ribbon spools 22a and 22b. The spools 22a and 22b serve as a take-up spool and a supply spool, respectively, for a thermal transfer ink ribbon 23. The ribbon 23 is set in the mechanism section 20 so as to partly extend out from a lower end portion of the cassette 21. A thermal head 24 is arranged at substantially the center of the printing section 13 of the mechanism section 20 so that the head surface of the head 24 slightly protrudes from the bottom surface of the printer 10. The head 24 has 64 heat generating elements arranged in a line (8 dots/mm) disposed on its lower flat portion. The head 24 is mounted so as to be slightly vertically moved with respect to a head mounting member 25. The head 24 is normally subjected to a downward printing pressure obtained by means of an elastic member (not shown) disposed between the head 24 and the mounting member 25. An ink ribbon guide 26 and contact sections 27a and 27b are mounted on the mounting member 25. The guide 26 is arranged close to the rear side of the head 24 with respect to the print moving direction M and parallel to the head 24. The contact sections 27a and 27b are separately arranged at two ends of the guide 26, extend downward therefrom, and are brought into contact with the paper A in a printing operation.

The cassette 21 and the guide 26 are separately formed. The cassette 21 is not located close to the head 24 when it is mounted. Therefore, since the cassette 21 can be easily mounted/removed, the printer 10 can be decreased in size.

A flexible printed circuit board 28 is disposed along the mounting member 25. A print control signal is supplied to the head 24 via the board 28. A rubber roller 29 mounted on an L-shaped frame 30 is arranged at a front portion, with respect to the direction M of the head 24, of the lower surface of the printer 10 on which the head 24 is arranged. When the printer 10 is moved in the direction M in the printing operation, the roller 29 rotates in contact with the paper A. A driving gear 31 is coaxially fixed on the side portion of the roller 29. The gear 31 is formed to have a diameter smaller than that of the roller 29. The gear 31 is coupled to an encode disk 36 via intermediate gears 32, 33, 34a, 34b, and 35. Rotation of the gear 31 is transmitted to the disk 36. A plurality of slits 36a, 36b, . . . , are radially formed in the disk 36 at regular intervals. An LED 37 and a photosensor 38 are arranged adjacent to each other at opposing positions with a slit formation portion of the disk 36 disposed therebetween. Light emitted from the LED 37 is incident on the photosensor 38 through the slits 36a, 36b, . . . , of the disk 36. When the disk 36 is rotated by moving the printer 10 in the direction M, the light transmitted from the LED 37 is interrupted at a rate corresponding to the moving speed of the printer 10. That is, an encoder 39 is constituted by the encode disk 36, the LED 37, the photosensor 38, and the like.

The gear 35 of the disk 36 is further coupled with a take-up gear 41 via an intermediate gear 40. Rotation of the roller 29 is transmitted to the gear 41 via the disk 36. A ribbon take-up shaft 42 extends coaxially from the gear 41. A stopper arm 43 which is urged against the gear 41 is disposed on a stem portion of the shaft 42. The arm 43 is pivoted in a rotation direction of the gear 41 by an urging force of the gear 41. A stopper gear 44 which is engaged with the gear 41 is mounted on the tip end of the arm 43. When the gear 41 rotates in a ribbon take-up direction (counterclockwise), the arm 43 is pivoted by a preset angle in the same direction as the gear 41 and is stopped. When the gear 41 rotates in a reverse direction (clockwise), the arm 43 is pivoted until the gear 44 at its tip end comes into engagement with the gear 40, and is then stopped. That is, the intermediate gears 40 and 41, the arm 43, and the stopper gear 44 are combined to constitute a reverse rotation inhibition mechanism. In this case, the disk 36 and the take-up shaft 42 are rotated with respect to the roller 29 by means of one train of gears. Therefore, a space occupied by the gear mechanism in the print mechanism section 20 is minimized to reduce the whole size of the printer 10.

The cassette 21 is mounted on the mechanism section 20 with the take-up shaft 42 as its supporting shaft. The ink ribbon 23 partly extending outwardly from the lower end portion of the cassette 21 is guided by the ink ribbon guide 26 arranged in the printing section 13 of the printer 10, and is set in contact with the head surface of the thermal head 24. The guide 26 for precisely guiding the ribbon 23 on the head surface of the head 24 is integrally formed with the head mounting member 25 near the head 24. Therefore, the cassette 21 need not have a similar guide member. As a result, the cassette 21 can be made smaller to reduce the size of the printer 10.

Figure 3:
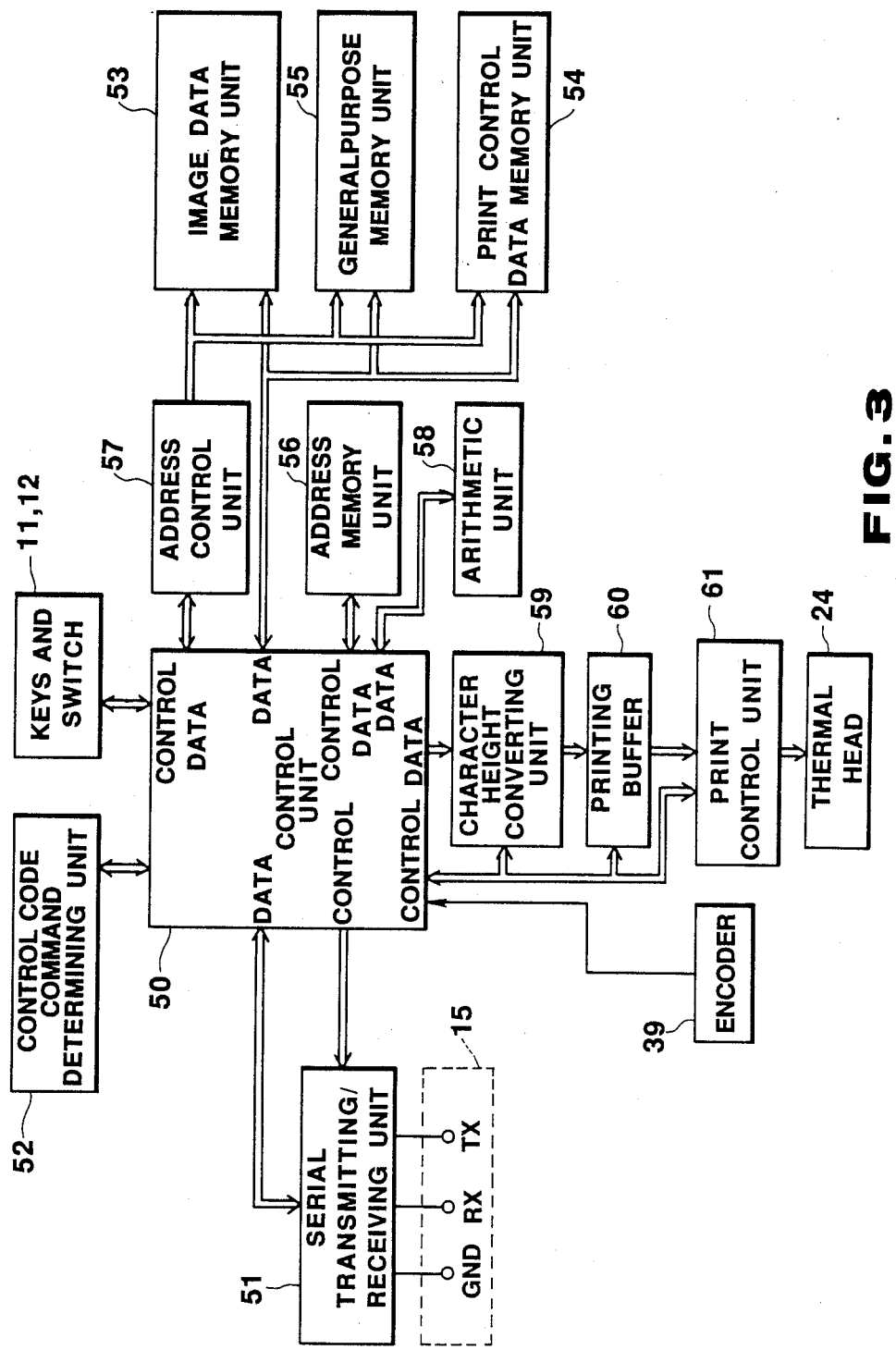
FIG. 3 is a block diagram showing a circuit arrangement of the printer shown in FIG. 1.

An arrangement of circuits formed in the manually sweepable printer 10 will be described below with reference to FIG. 3.

A control unit 50 performs various types of control operations on the basis of input signals from the mode switch 11, the print start key 12, and the encoder 39.

A serial transmitting/receiving unit 51 coupled to the control unit 50 operates on the basis of a control signal from the control unit 50. The unit 51 performs data transmission/reception with respect to the personal computer 16, the wordprocessor 17, or the electronic notebook 18 via the connector section 15 and the coupling cord 19. The unit 51 supplies data from the control unit 50 to the personal computer 16 or the like and data from the personal computer 16 or the like to the control unit 50.

Figure 4:
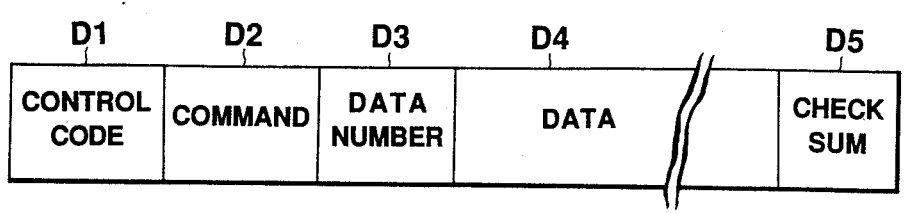
FIG. 4 is a view showing a format of data to be transferred between a personal computer, a wordprocessor, or an electronic notebook, and the manually sweepable printer.
Figure 5:
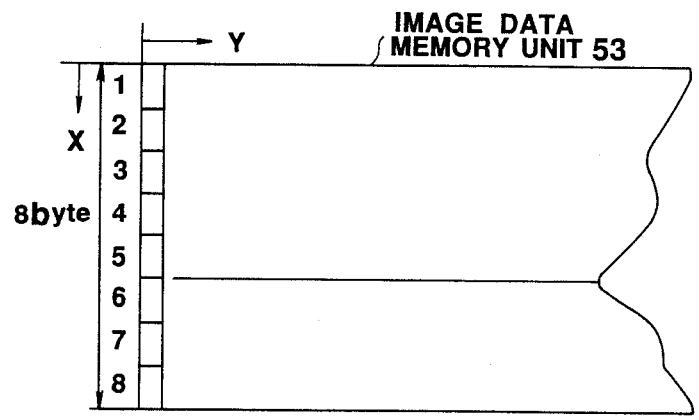
FIG. 5 is a view showing a memory format of an image data memory shown in FIG. 3.

The data to be transmitted/received by the serial transmitting/receiving unit 51 has a format shown in FIG. 4. That is, this data includes one byte of a control code D1, one byte of a command D2, two bytes of a data number D3, data D4, and one byte of a check sum D5. The control code D1 is for checking the state of a receiving apparatus and indicating the state of a transmitting apparatus. More specifically, the code D1 includes a text start code representing transmission start, a state enquiry code (ENQ), a transmission end code (EOT), an acknowledgment code (ACK), a negative acknowledgment code (NAK), and the like.

The command D2 includes a code representing the attribute of data to be supplied next, a control code for data write and data output, and the like. More specifically, the command includes a code representing that data to be supplied next is a magnification code for designating a print magnification of character data, a code representing that the data is address data, a code representing that the data is a line feed code, and the like.

The data number D3 represents the number of data (the number of bytes) of data to be supplied next to the data number D3.

The data D4 includes magnification data representing a vertical magnification and a horizontal magnification, address data, character data, and the like.

The check sum D5 is code data for checking whether the transmission data from the command D1 to the data D4 is correctly transmitted. The check sum D5 is output so that a result of adding a total sum of the transmission data to the data of the check sum becomes a predetermined value.

The control unit 50 is connected to a control code command determining unit 52 for determining the control code D1 and the command D2 of data received via the serial transmitting/receiving unit 51, an image data memory unit 53 for storing the character data, a print control data memory unit 54 for storing, e.g., print control data such as magnification data received as data or address data in the image data memory unit 53 corresponding to the line feed code, a general-purpose memory unit 55 for temporarily storing, e.g., repeating data and repeat number data received as data when the same data is to be written in the image data memory unit 53 a plurality of number of times, and an address memory unit 56 for storing, e.g., address data (representing an X (column) direction address of the image data memory unit 53) for designating a write area of the unit 53.

The image data memory unit 53, the print control data memory unit 54, and the general-purpose memory unit 55 are address-controlled by an address control unit 57 which operates under the control of the control unit 50.

The image data memory unit 53 includes a memory area having 8 bytes (64 bits) in the column direction (X direction) in correspondence with the number of dots of the thermal head 24 and a memory area having 1,600 bits in the row direction and capable of storing data corresponding to 200 mm of a printing length (in the case of a reference character size and a reference character pitch). Assuming that a character pattern transmitted from the peripheral apparatuses 16 to 18 has 24×24 bits, this character pattern is normally written in a 3-byte area between 6th and 8th bytes. An image write area of the unit 53 can be arbitrarily set by outputting an area set code as the command and address data as the data from the peripheral apparatuses 16 to 18.

Figure 6:
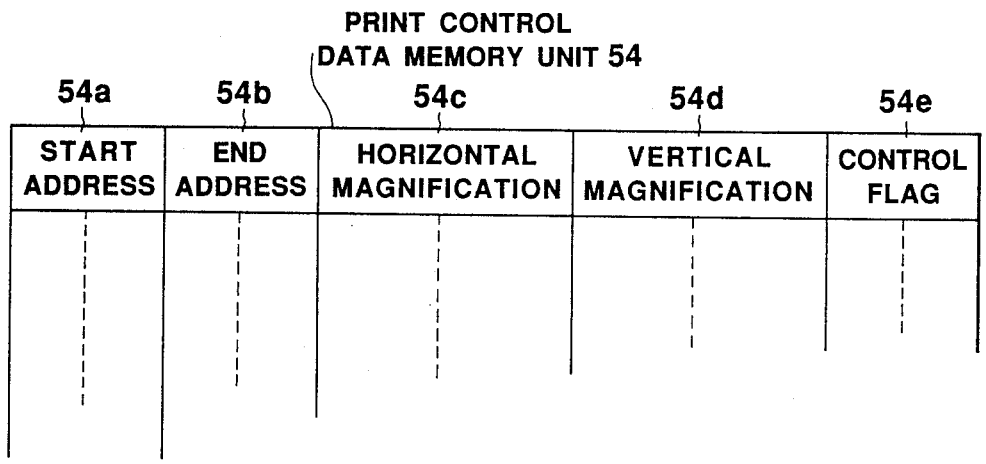
FIG. 6 is a view showing a memory format of a print control data memory shown in FIG. 3.

As shown in FIG. 6, the print control data memory unit 54 includes a start address memory area 54a, an end address memory area 54b, a horizontal magnification data memory area 54c, a vertical magnification data memory area 54d, and a control flag memory area 54e.

When the line feed code is received from one of the apparatuses 16 to 18, the start address memory area 54a and the end address memory area 54b store a Y (row) direction address of the image data memory unit 53 designated by the address control unit 57 as an end address and data obtained by incrementing the end address by one as a start address of the next data. The horizontal magnification data memory area 54c and the vertical magnification data memory area 54d store the magnification data received from the corresponding one of the apparatuses 16 to 18.

The control flag memory area 54e stores a flag (1 or 0) representing whether only data stored between the 6th and 8th bytes of the image data memory unit 53 is to be printed or all the data stored between the 1st to 5th bytes are to be printed.

The control unit 50 is coupled to an arithmetic unit 58 for performing various types of arithmetic operations.

The control unit 50 is also coupled to a character height converting unit 59, a printing buffer 60, and a print control unit 61.

The character height converting unit 59 is controlled by the control unit 50 in accordance with the vertical magnification data stored in the print control data memory unit 54. The converting unit 59 sequentially enlarges character pattern data supplied from the image data memory unit 53 via the control unit 50, e.g., increases the character height twice that of a reference character height and outputs the data to the printing buffer 60.

The print control unit 61 is controlled by the control unit 50 to drive the thermal head 24 on the basis of data output from the printing buffer 60.

An operation of the system having the above arrangement will be described below.

In order to transfer data formed in the peripheral apparatuses 16 to 18 to the manually sweepable printer 10, an operator couples the printer 10 with a desired one of the apparatuses 16 to 18 by the coupling cord 19 and sets the mode switch 11 in the data input mode IN.

Figure 7:
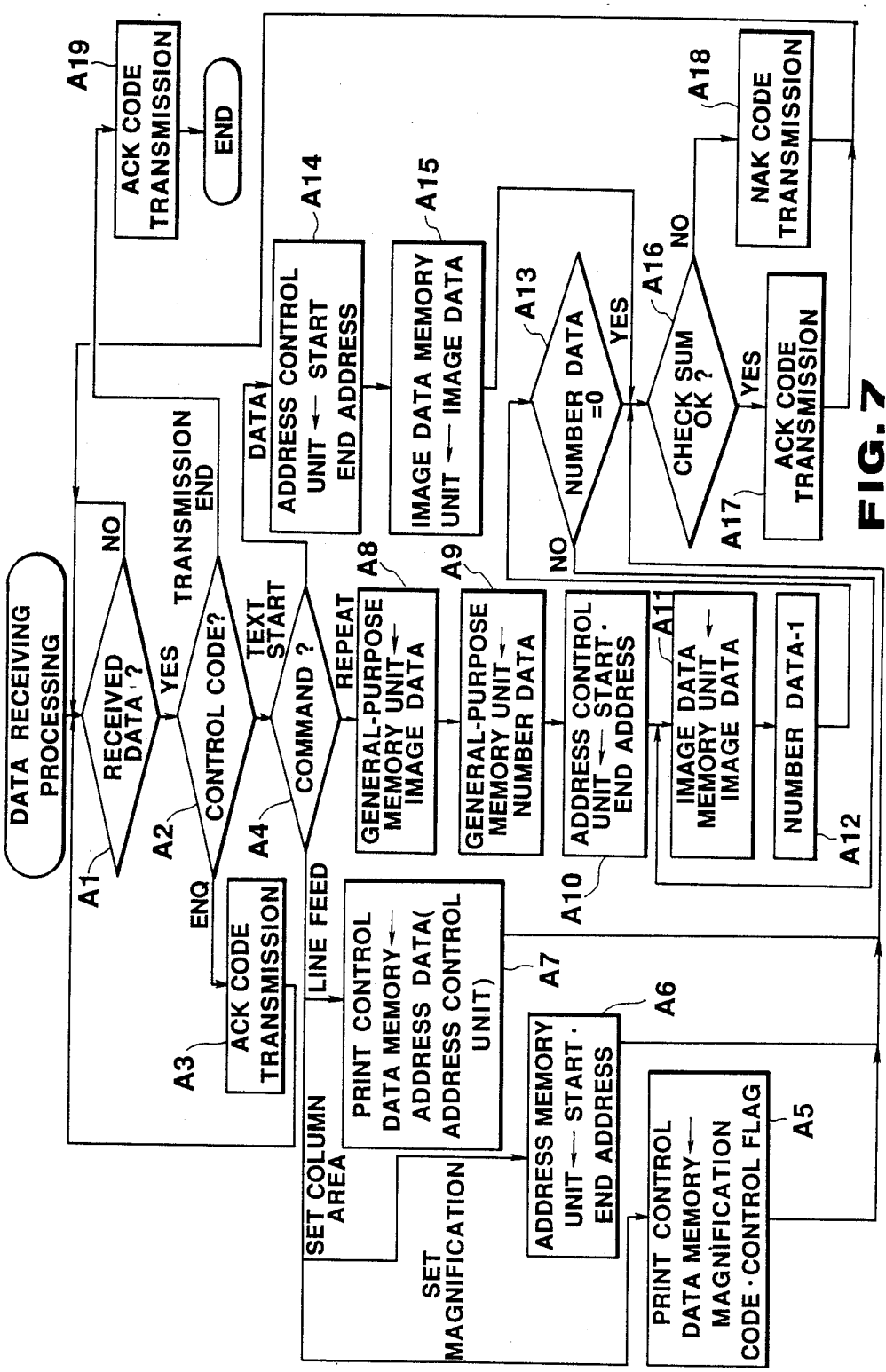
FIG. 7 is a flow chart for explaining data receiving processing of the manually sweepable printer shown in FIG. 1.

In this state, the printer 10 is set in a data reception waiting state and performs data receiving processing in accordance with a flow chart shown in FIG. 7.

The control unit 50 checks whether the serial transmitting/receiving unit 51 receives data from the external apparatus (step A1). If no data is received, step A1 is repeatedly executed. If data is received, the control unit 50 fetches the received data from the serial transmitting/receiving unit 51 and outputs the received data to the control code command determining unit 52. The unit 52 checks the control code D1 of the received data (step A2). If the control code D1 is determined to be the "state enquiry code (ENQ)", the determining unit 50 outputs the acknowledgment code (ACK) to the corresponding one of the peripheral apparatuses 16 to 18 via the transmitting/receiving unit 51 (step A3). Subsequently, if the determining unit 52 determines that the control code D1 transmitted from one of the apparatuses 16 to 18 is the "text start code" (step A2), the flow advances to step A4, and the control unit 50 supplies the command D2 received next to the control code to the determining unit 52 (step A8).

If the determining unit 52 determines that the received command D2 is the character size conversion set code, the control unit 50 stores the magnification data and the control flag of the data D4 to be received next in the horizontal magnification data memory area 54c, the vertical magnification data memory area 54d, and the control flag memory area 54e of the print control data memory unit 54 (step A5).

If the determining unit 52 determines that the received command D2 is the column area set code, the control unit 50 stores the address data of the data D4 to be received next in the address memory unit 56 (step A6).

If the determining unit 52 determines that the received command D2 is the line feed code, the Y direction address of the image data memory unit 53 currently designated by the address control unit 57 is read out from the address control unit 57 and stored in the end address memory area 54b of the print control data memory unit 54. The address is updated (+1) by the arithmetic unit 58 and stored in the start address memory area 54a (step A7).

If the determining unit 52 determines that the received command D2 is the repeat code, the control unit 50 stores the image data and the repeat number data included in the data D4 to be received next in the general-purpose memory unit 55 (steps A8 and A9). The control unit 50 supplies the start address and end address in the X direction of the image data memory unit 53, stored in the address data memory unit 56 (by the processing in step A6) (if they are not stored, a start address and an end address corresponding to the 6th to 8th bytes of the image data memory unit 53), to the address control unit 57 (step A10). In addition, the control unit 50 reads out the image data from the general-purpose memory unit 55 and controls the address control unit 57 to store the readout data in a predetermined area of the image data memory unit 63 (step A11). The control unit 50 reads out the repeat number data from the memory unit 55 and outputs the readout data to the arithmetic unit 58. The arithmetic unit 58 subtracts "1" from the repeat number data (step A12) and checks whether the subtraction result is "0" (step A13). If the subtraction result is not "0", the control unit 50 stores the subtraction result again in the general-purpose memory unit 55 and repeats the processing from steps A11 to A13 until the subtraction result becomes "0".

That is, when one of the peripheral apparatuses 16 to 18 transmits the repeat code as the command, the control unit 50 writes the image data include in the data D4 to be received next to the command in the image data memory unit 53 a plurality of number of times corresponding to the simultaneously received repeat number data.

In this manner, a transfer time for a character in which the same image data such as "—" or "=" continues or a space portion can be reduced.

If the control code command determining unit 52 determines that the received command D2 is the data code, the control unit 50 supplies the address data stored in the address data memory unit 56 to the address control unit 57 as in step A10 (step A14), and stores the image data included in the data D4 to be received next to the command in the image data memory unit 53.

When data processing for the command D2 is finished, the control unit 50 outputs the check sum data D5 to be received next to the data D4 to the arithmetic unit 58 to perform predetermined processing, and checks whether the received data from the command D2 to the data D4 is correct (step A16).

If the above received data is correct, the control unit 50 transmits the acknowledgment code (ACK) to the corresponding one of the peripheral apparatuses 16 to 18 via the serial transmitting/receiving unit 51 (step A17). If the received data is not correct, the control unit 50 transmits the negative acknowledgment code (NAK) to the corresponding one of the apparatuses 16 to 18 (step A18) and returns to the received data waiting state (step A1).

If the transmission end code is output from one of the apparatuses 16 to 18, this is determined by the control code command determining unit 52 (step A2), and the control unit 50 outputs the acknowledgment code (ACK) to this one of the apparatuses 16 to 18 (step A19).

An operation of printing the data transferred from one of the peripheral apparatuses 16 to 18 to the manually sweepable printer 10 as described above will be described below.

An operator sets the mode switch 11 in the print mode PRI. The operator then places the printer 10 on the printing paper A so that the printing section 13 is brought into contact with the paper A, and moves the printer 10 in the direction indicated by arrow M while depressing the print start key 12. At this time, the operator can check a printing position of the thermal head 24 and the ink ribbon 23 through the check window 14 formed in the rear side surface with respect to the moving direction M of the printer 10. Therefore, a printing area can be correctly set in correspondence with ruled lines or the like on the paper A.

As the printer 10 is moved, the contact sections 27a and 27b are brought into contact with the paper A, and the rubber roller 29 rotates. Rotation of the roller 29 is transmitted to the gears 31, 32, 33, 34a, 34b, and 35 (FIG. 2). As the gear 35 rotates, the encode disk 36 rotates, and light emitted from the LED 37 to the photosensor 38 through the slits 36a, 36b, . . . , is interrupted by rotation of the disk 36. The disk 36 rotates counterclockwise as the printer 10 moves in the M direction. Therefore, a pulse signal output from the photosensor 38 is an output from the encoder 39 and supplied as a travel distance detection signal with respect to the printer 10 to the control unit 50. Rotation of the gear 35 which rotates the disk 36 is further transmitted to the take-up gear 41 and the ribbon take-up shaft 42 via the gear 40 and then transmitted to the take-up spool 22b in the ink ribbon cassette 21.

As a result, the spool 22b rotates to take up the thermal transfer ink ribbon 23 guided from the ribbon supply spool 22a onto the head surface of the thermal head 24 and the ink ribbon guide 26 of the printing section 13.

As the printer 10 moves, the shaft 42 rotates in accordance with the travel distance of the printer 10 so as not to produce sliding between the paper A and the ink ribbon 23. The ribbon 23 is slightly urged against the paper A by the head 24 which is normally subjected to a downward printing pressure obtained by the elastic member (not shown) disposed between the head mounting member 25 and the head 24. A stable contact state of the head 24 with respect to the paper A is maintained by contact states of the roller 29 and the contact sections 27a and 27b. When printing is performed by moving the printer 10 in the M direction, the gear 41 rotates counterclockwise, and the stopper arm 43 is pivoted and held at a predetermined angle.

Figure 8:
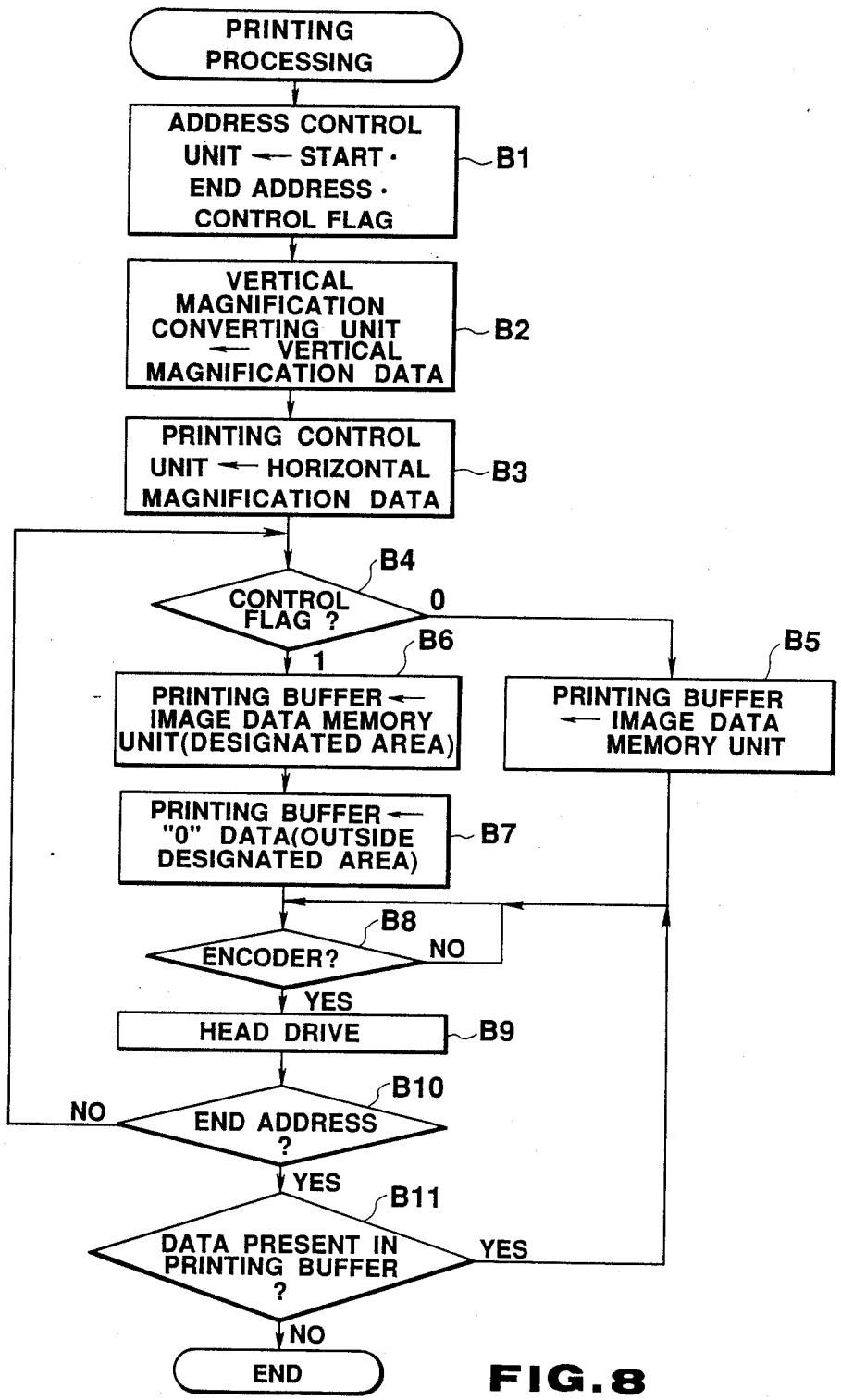
FIG. 8 is a flow chart for explaining printing processing of the manually sweepable printer shown in FIG. 1.

A circuit operation of the manually sweepable printer 10 will be described below on the basis of a flow chart shown in FIG. 8.

When the mode switch 11 is set in the print mode PRI, the control unit 50 reads out the start address, the end address, and the control flag from the print control data memory unit 54 and supplies the addresses and the flag to the address control unit 57 (step B1). The control unit 50 reads out the character height conversion data and the character width conversion data from the print control data memory unit 54 and supplies the character height conversion data and the character width conversion data to the character height converting unit 59 and the print control unit 61, respectively (steps B2 and B3).

The address control unit 57 checks whether the control flag is "1" or "0" (step B4).

If the control flag is "0", the control unit 57 performs address designation for all areas in the X direction of the image data memory unit 53, and transfers image data stored in the areas to the printing buffer 60 (step B5).

The image data is subjected to character height converting processing by the character height converting unit 59 on the basis of the character height conversion data supplied in step B2.

If the address control unit 57 determines in step B4 that the control flag is "1", the control unit 50 reads out the start and end addresses in the X direction of the image data memory unit 53 stored in the address memory unit 56 and supplies the addresses to the address control unit 57. The address control unit 57 performs address designation for the image data memory unit 53 on the basis of the start and end addresses supplied from the address memory unit 56 and transfers image data of the designated address area to the printing buffer 60 (step B6). As described above, the image data read out from the image data memory unit 53 is subjected to character height converting processing by the character height converting unit 59 and supplied to the printing buffer 60.

Thereafter, the control unit 50 supplies data "0" to the remaining areas of the buffer 60 (step B7).

When transfer of the image data to the printing buffer 60 is finished as described above, the control unit 50 waits for an encoder pulse (step B8).

When the encoder pulse is generated, the print control unit 61 drives the thermal head 24 on the basis of the data supplied to the printing buffer 60 and prints the image data of one line (step B9). The print control unit 61 checks whether the address value designated by the address control unit 57 with respect to the image data memory unit 53 is the end address in the Y direction of the unit 53 obtained by the print control data memory unit 54 (step B10). If the designated address of the unit 53 is the end address, the unit 61 prints all the data in the printing buffer 60 and then ends the printing processing (step B11). If the end address is not reached, the unit 61 updates the designated address of the image data memory unit 53 and repeats the processing from steps B4 to B9.

In this case, on the basis of the character width conversion data obtained by the print control data memory unit 54, the print control unit 61 prints the same image data in accordance with the number of encoder pulses corresponding to the character width conversion data.

Therefore, according to the system of the first embodiment described above, a document formed by the peripheral apparatuses 16 to 18 such as a wordprocessor is transferred to the manually sweepable printer 10 and then printed on an arbitrary position by using the printer 10.

In addition, since the image data and the print control information (e.g., the magnification data) are separately transferred and stored, a transfer time can be reduced and the memory can be effectively used.

A wordprocessor system according to the second embodiment of the present invention will be described below.

In the second embodiment, the same reference numerals as in the first embodiment denote the same parts and a detailed description thereof will be omitted.

Figure 9:
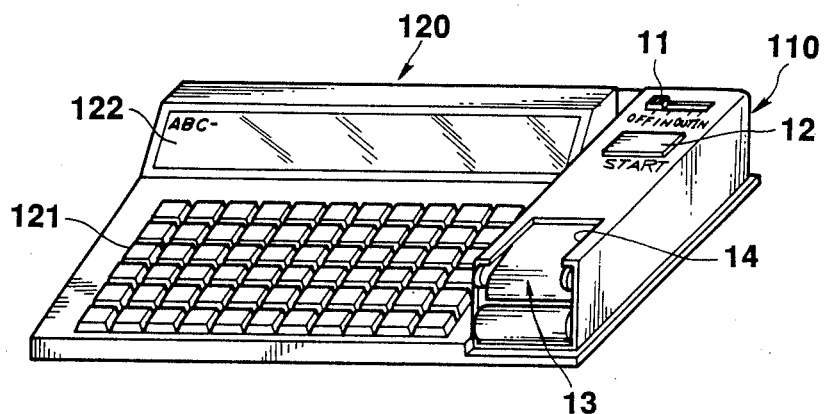
FIG. 9 is a perspective view showing an outer appearance of a wordprocessor system according to the second embodiment of the present invention.
Figure 10:
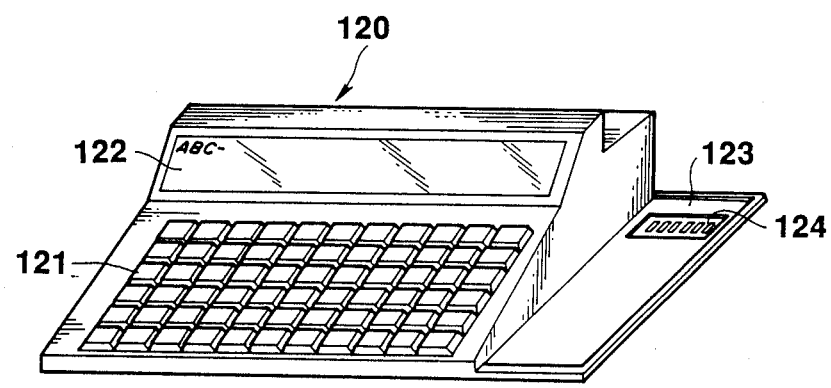
FIG. 10 is a perspective view showing an outer arrangement of a wordprocessor main body shown in FIG. 9 from which a manually sweepable printer is removed.

Referring to FIGS. 9 and 10, a wordprocessor main body 120 has a key-input unit 121 including character input keys and function keys on its upper surface, and a display unit 122 for displaying key-input characters and a function select screen.

A printer housing unit 123 is formed at the right side of the main body 120. A compact manually sweepable printer 110 is mounted on the unit 123.

Figure 11:
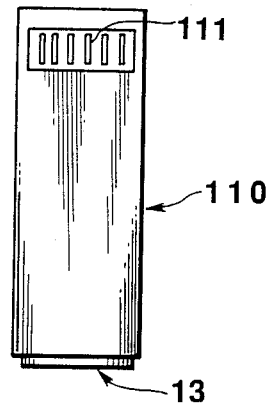
FIG. 11 is a rear view showing the manually sweepable printer shown in FIG. 9.

The unit 123 has a recess connector 124 including data transfer terminals and power supply terminals. As shown in FIG. 11, the printer 110 has a projecting connector 111 provided on one side surface of the printer 110 corresponding to the formation position of the recess connector 124, for electrically connecting the recess connector 124 to receive transfer data and a supply voltage therefrom. That is, printing data and a printing drive voltage are supplied to the printer 110 via the connectors 124 and 111 when the printer 110 is mounted on the main body 120. The printing data supplied to the printer 110 is stored in a printing data memory unit, and the printing drive voltage is stored in a power source unit comprising a secondary battery.

Figure 12:
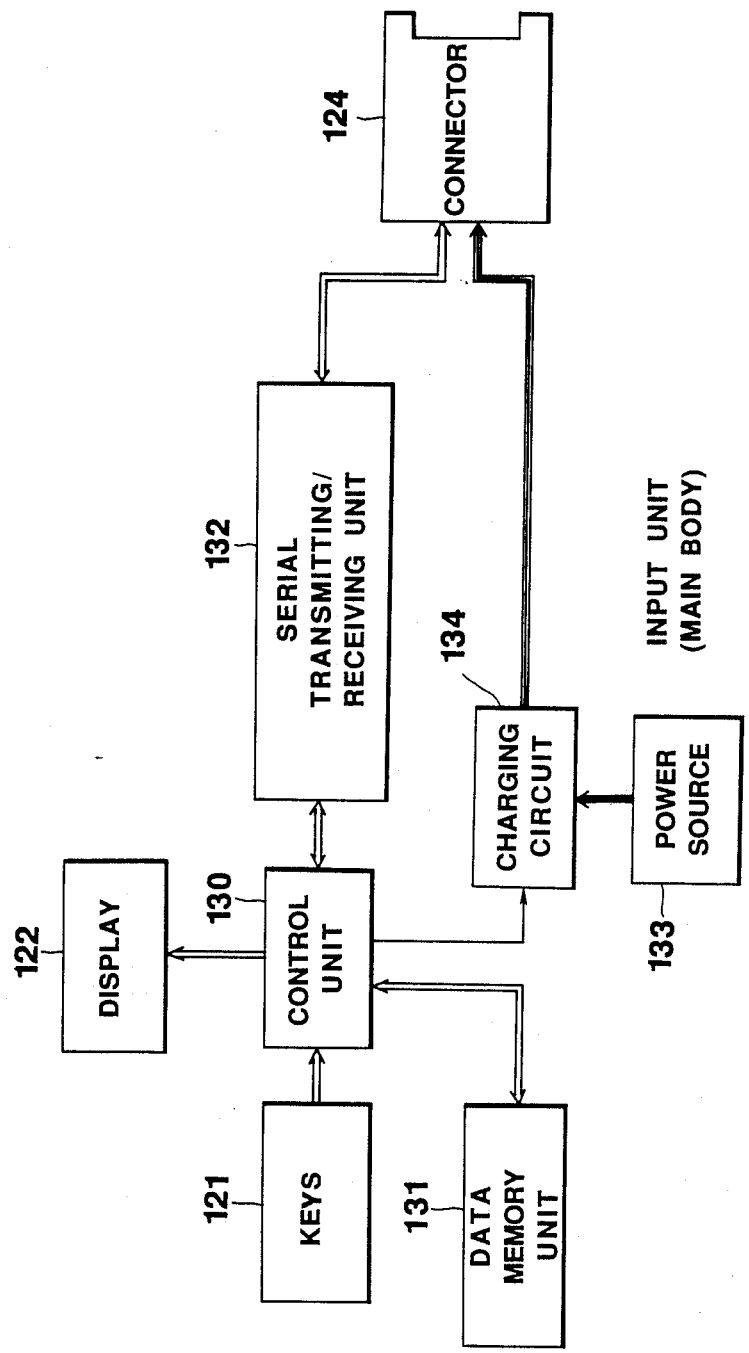
FIG. 12 is a block diagram showing a circuit arrangement of the wordprocessor main body shown in FIG. 9.

FIG. 12 shows a circuit arrangement of the wordprocessor main body 120. A control unit 130 is connected to a data memory unit 131 and a serial transmitting/receiving unit 132 as well as the key-input unit 121 and the display unit 122. Key-input character data is stored in the data memory unit 131. The key-input character data is output from the memory unit 131 to the printer 110 side via the control unit 130, transmitting/receiving unit 132, and the recess connector 124 on the basis of a predetermined key operation.

A power source unit 133 of the main body 120 is connected to a charging circuit 134 whose charging operation is controlled by the control unit 130. The circuit 134 charges a secondary battery (141 to be described later) of the printer 110 in accordance with a charge request supplied from the printer 110 to the control unit 130 via the transmitting/receiving unit 132.

Figure 13:
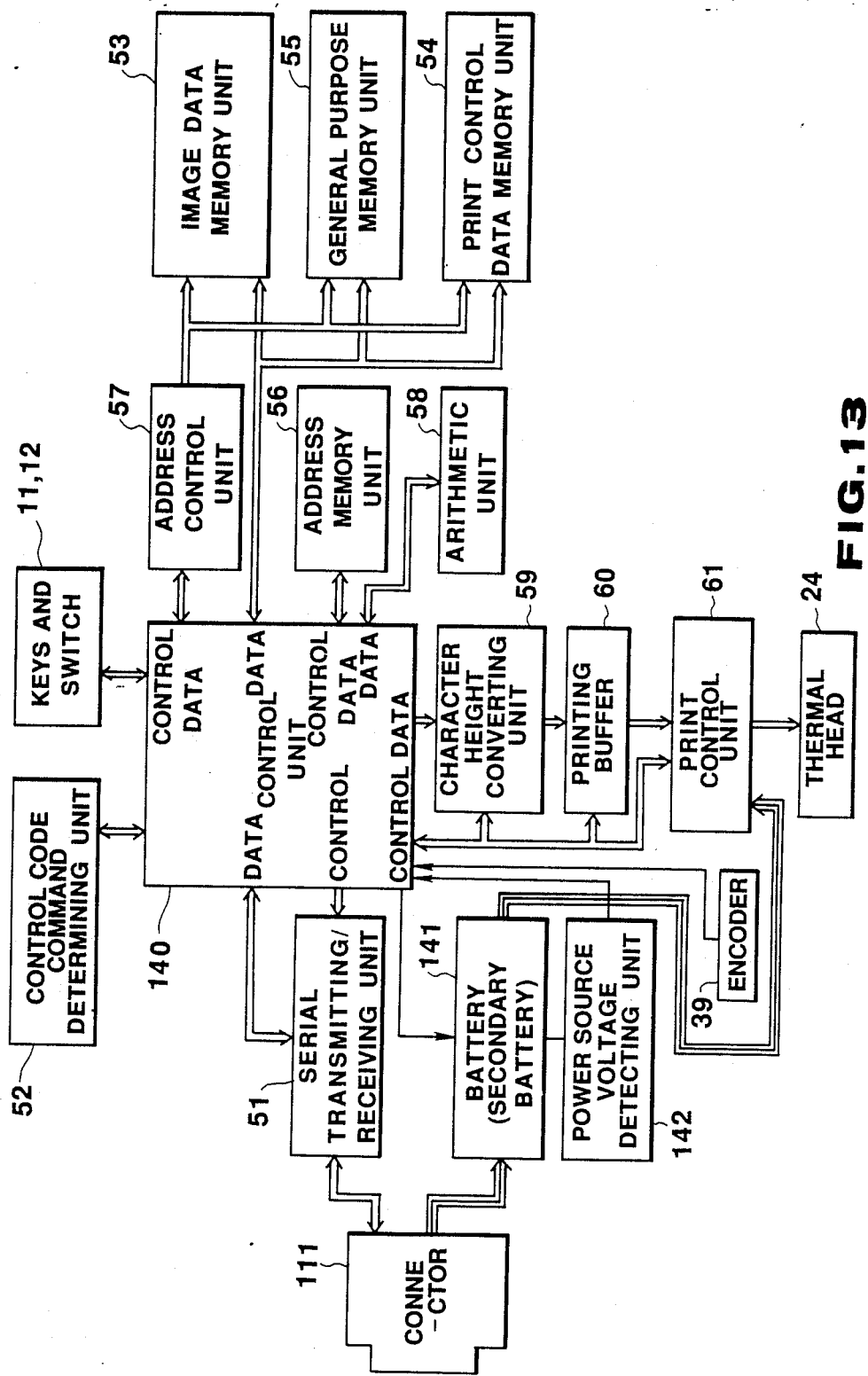
FIG. 13 is a block diagram showing a circuit arrangement of the manually sweepable printer shown in FIG. 9.

FIG. 13 shows a circuit arrangement of the manually sweepable printer 110. A main part of the printer 110 has substantially the same arrangement as the manually sweepable printer 10 according to the first embodiment shown in FIG. 3.

The secondary battery 141 of the printer 110 is connected to the connector 111. The battery 141 is used as a drive power source of a thermal head 24. The battery 141 is charged by a charging power source voltage applied from the wordprocessor main body 120 via the connector 111. The voltage of the battery 141 is normally monitored by a power source voltage detecting unit 142. When the voltage of the battery 141 drops below a drive voltage, the detection unit 142 outputs a detection signal to a control unit 140. When the control unit 140 receives the detection signal from the detection unit 142, it outputs a charging request signal to the wordprocessor main body 120.

An operation of the wordprocessor system having the above arrangement will be described below.

As shown in FIG. 9, when the manually sweepable printer 110 is mounted on the wordprocessor main body 120, the connector III at the printer 110 is electrically connected to the connector 124 at the main body 120.

In this state, when a mode switch 11 is set in a data input mode IN, a charging voltage can be applied from the main body 120 to the secondary battery 141 of the printer 110, and printing data can be received therefrom.

Figure 14:
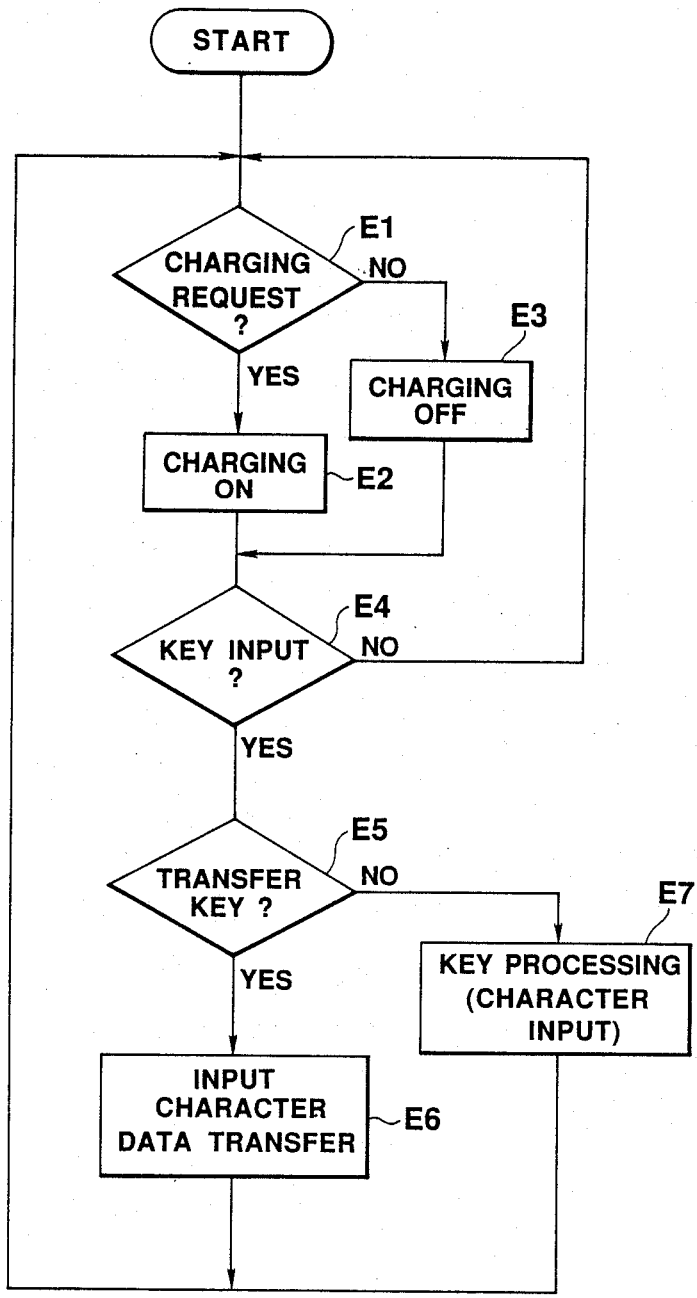
FIG. 14 is a flow chart for explaining processing to be performed when the manually sweepable printer is mounted on the wordprocessor main body shown in FIG. 9.
Figure 15:
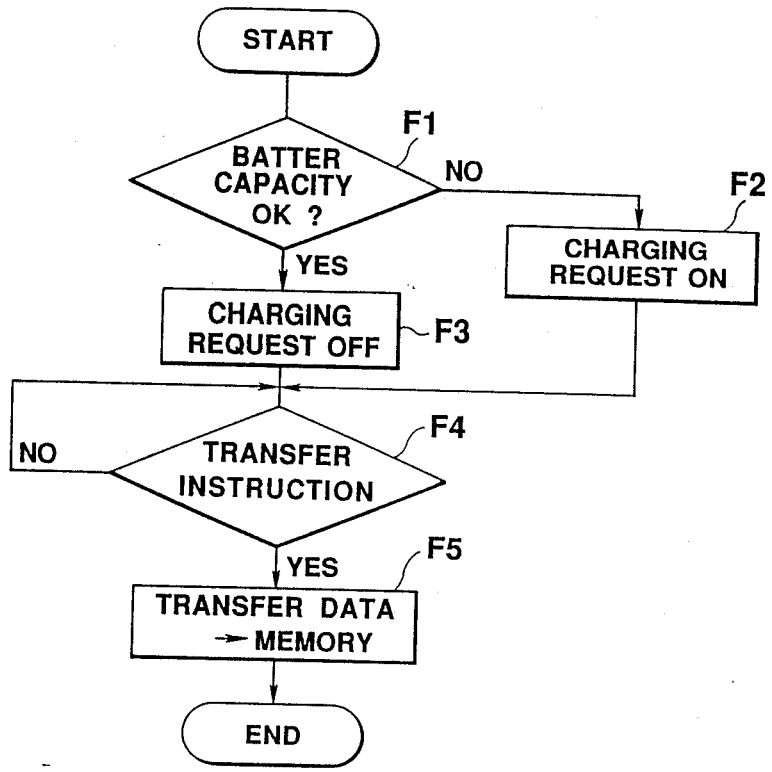
FIG. 15 is a flow chart for explaining processing to be performed in the manually sweepable printer when the manually sweepable printer shown in FIG. 9 is mounted on the wordprocessor main body.

FIGS. 14 and 15 are flow charts for explaining operations of the main body 120 and the printer 110 in the above state.

When the voltage level of the battery 141 monitored by the power source voltage detecting unit 142 shown in FIG. 13 drops below a predetermined printing drive voltage required for driving the thermal head 24 while the printer 110 is mounted as shown in FIG. 9, the control unit 140 of the printer 110 supplies a "charge request ON" signal to the main body 120 via a serial transmitting/receiving unit 51 (steps F1 and F2). The control unit 130 shown in FIG. 12 receives the "charge request ON" signal from the printer 110 via the recess connector 124 and the transmitting/receiving unit 132, thereby activating the charging circuit 134 (steps E1 and E2). The charging voltage signal output from the circuit 134 is input to the printer 110 via the connectors 124 and 111, thereby starting charging of the power source voltage for the battery 141.

When the voltage level monitored by the detecting unit 142 reaches a predetermined voltage level while the battery 141 of the printer 110 is charged, the control unit 140 of the printer 110 supplies a "charge request OFF" signal to the main body 120 (steps F1→F3). The control unit 130 of the main body 120 receives the "charge request OFF" signal from the printer 110 and stops the charging operation by the charging circuit 134 (steps E1→E3).

In this case, if an operator operates predetermined keys on the key-input unit 121 in order to transfer a document formed by the wordprocessor main body as printing data to the printer 110, printing data stored in the data memory unit 131 of the main body 120 is patterned and transferred from the control unit 130 to the printer 110 via the serial transmitting/receiving unit 132 (steps E4 to E6). In the printer 110, the printing data transferred from the main body 120 is supplied to the control unit 140 via a serial transmitting/receiving unit 51 and stored in an image data memory unit 53 and the like as in the first embodiment (steps F4 and F5).

If, for example, the character input keys are operated on the key-input unit 11 of the main body 120, the key-input data is stored in the data memory unit via the control unit 130 (steps E4, E5→E7).

In this manner, charging of the battery 141 of the printer 110 and transfer of the printing data from the main body 120 to the printer 110 are performed.

In order to print the transferred printing data, the printer 110 is removed from the main body 120, and the mode switch 11 is set in a print mode PRI. As a result, printing is performed by the same operation as in the first embodiment.

According to the wordprocessor system having the arrangement as described above, printing data formed by the wordprocessor main body 120 can be transferred to the printer 110 and stored in the image data memory unit 53 while the manually sweepable printer 110 is mounted on the main body 120. Therefore, no code for printing data transfer need be provided between the main body 120 and the printer 110. As a result, a printing operation can be easily, manually performed.

In addition, the secondary battery 141 of the printer 110 can be automatically charged while the printer 110 is mounted on the main body 120 as described above. Therefore, since no power source code need be provided in addition to the data transfer code, data can be easily transferred and printed at any place.

The third embodiment of the present invention will be described below.

In the third embodiment, the same reference numerals as in the first and second embodiments denote the same parts and a detailed description thereof will be omitted.

Figure 16:
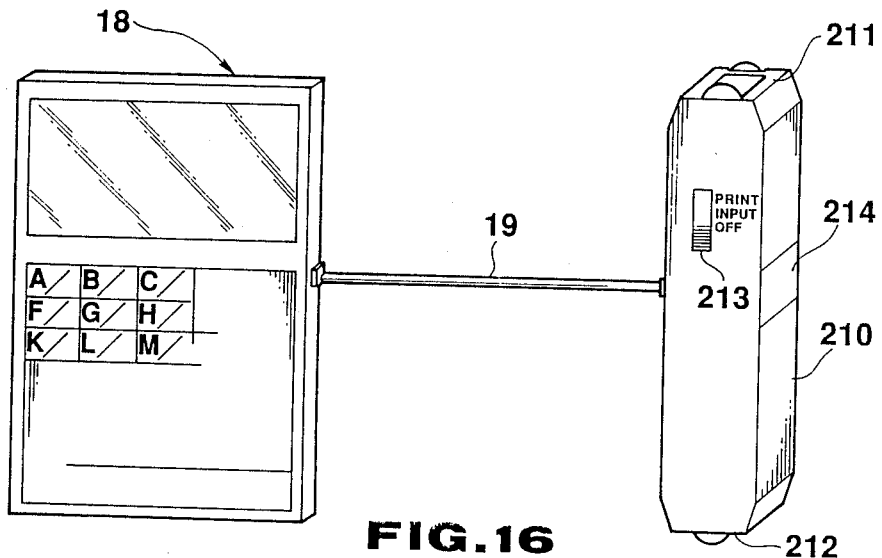
FIG. 16 is a perspective view showing an outer appearance of a data processing system according to the third embodiment of the present invention.

FIG. 16 shows a state in which a manually sweepable copier 210 is connected to the electronic notebook 18 shown in FIG. 1.

The copier 210 includes an 8-mm wide reading section 211 for reading an optical image at one end of its housing, and a printing section 212 for printing image data stored in an internal memory at the other end of the housing. A mode switch 213 for switching between a read/communication mode (INPUT) and a print mode (PRINT) is provided on the side surface of the housing. An operation key 214 for starting a read or print operation is provided on the front surface of the housing.

When an operator sets the mode switch 213 of the copier 210 in the read/communication mode (INPUT) and moves the housing in a predetermined direction while depressing the operation key 214 so that the reading section 211 is brought into contact with the surface to be read of an original, image information on the surface to be read corresponding to a moving track of the housing is optically read as image data and stored in the internal memory.

When data transfer is performed from the electronic notebook 18 to the copier 210 via a coupling cord 19 while the read/communication mode is set, the transferred data is stored in the internal memory as image data. In this case, write control data for a memory and output control data for printing are transferred together with the transferred data.

When the mode switch 213 of the copier 210 is set in the print mode (PRINT) and the housing is moved in a predetermined direction while depressing the operation key 214 so that the printing section 212 is brought into contact with the recording paper surface, the image data stored in the internal memory is sequentially printed out on the recording paper surface corresponding to the moving track of the housing.

Figure 17:
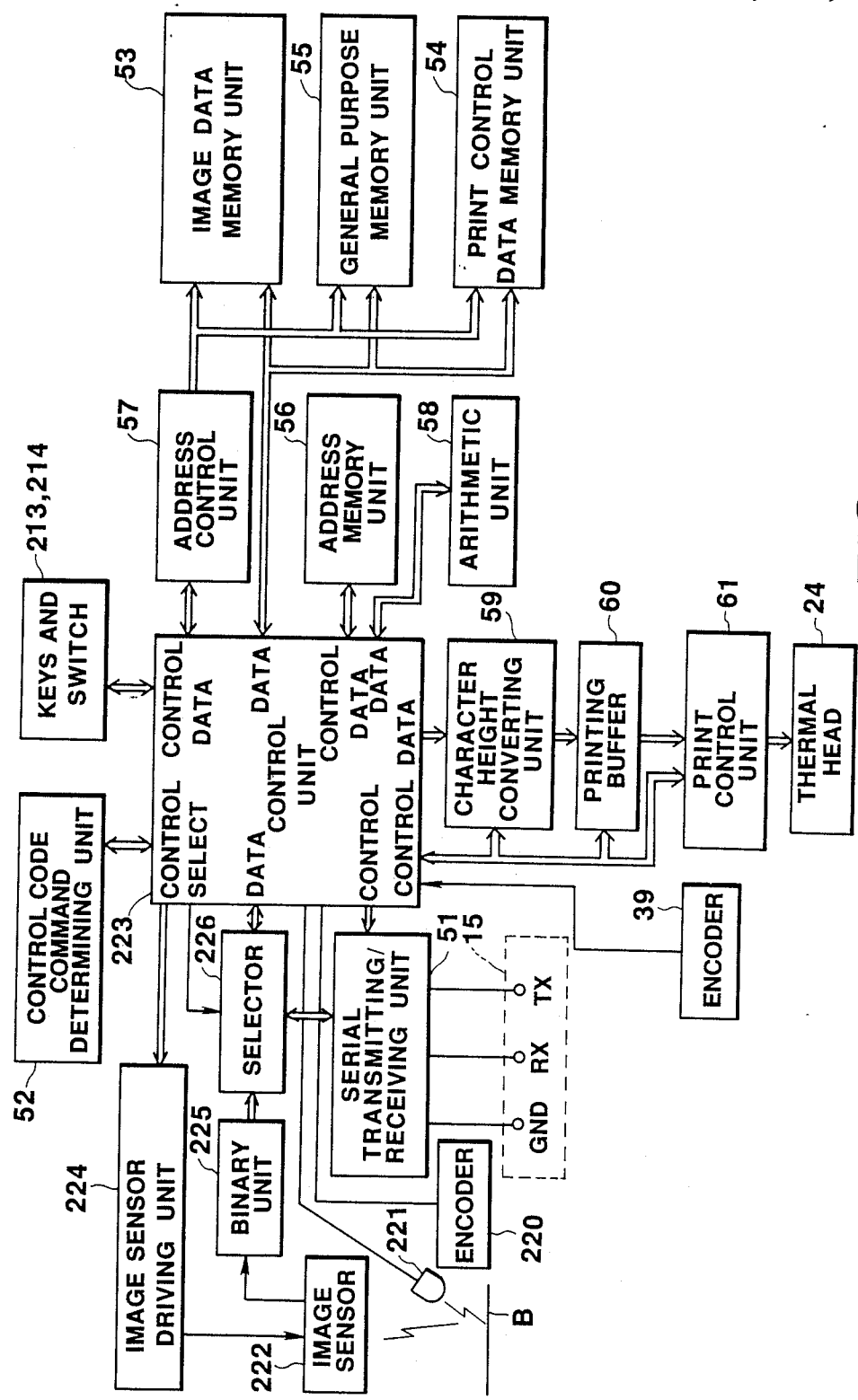
FIG. 17 is a block diagram showing a circuit arrangement of a copier shown in FIG. 16.

FIG. 17 shows an arrangement of electronic circuits of the copier 210. The image reading section 211 has a reading encoder 220 for detecting a travel distance of the copier 210 across the surface of an original B, and a CCD image sensor 222 for optically reading image data on the surface of the original B illuminated by an LED 221 in synchronism with the travel distance detection signal (encoder pulse) from the encoder 220. The resolution of the image sensor is 8 dots/mm, and a 64-dot line type CCD corresponding to the width of 8 mm of the image sensor 222 is used.

The image sensor 222 is driven by an image sensor driving unit 224 which receives a control signal from a control unit 223 in response to the encoder pulse from the reading encoder 220, and reads image data on the original B surface as an optical image. An image signal converted into an electrical signal by the image sensor 222 is converted into a black/white binary (digital) signal corresponding to the brightness of the optical image by a binary unit 225, supplied to the control unit 223, and sequentially stored in the image data memory unit 53. The serial transmitting/receiving unit 51 is connected to a selector 226.

When no data is supplied from the peripheral apparatuses in the read/communication mode, the control unit 223 outputs a select signal to the selector 226. In response to the select signal, the selector 226 supplies output data from the binary unit 225 to the control unit 223. The control unit 223 writes the image signal read by the image sensor 222 in the image data memory unit 53.

When data is supplied from the peripheral apparatuses in the read/communication mode, the control unit 223 outputs a select signal to the selector 226. In response to this select signal, the selector 226 supplies the data from the peripheral apparatus to the control unit 223 via the serial transmitting/receiving unit 51. The control unit 223 writes the data supplied from the peripheral apparatus in the image data memory unit 53, the print control data memory unit 54, or the address memory unit 56. In this case, the LED 221 is turned off, and no control signal is supplied to the image sensor driving unit 224. Therefore, the image data reading operation of the image sensor 222 is stopped.

A operation of the system having the above arrangement will be described below.

When the control unit 223 is set in the read/communication mode (INPUT) by operating the mode switch 213 of the copier 210, it supplies a control signal to the image sensor driving unit 224 to activate the image sensor 222. In order to read image data, an operator places the copier 210 on the surface of the original B so that the reading section 211 of the copier 211 is brought into contact with the surface, and moves the copier 210 while depressing the operation key 214. As a result, an encoder pulse is supplied from the reading encoder 220 to the control unit 223. The control unit 223 turns on the LED 221 to illuminate an area to be read on the original B surface, and sequentially stores the image data supplied from the image sensor 222 via the binary unit 225 and the selector 226 in the image data memory unit 53 in synchronism with the encoder pulse. The image data read by the CCD image sensor 222 is written in all column addresses of the memory area of the memory unit 53 in correspondence with the read width of 8 mm.

In order to receive character data transmitted from the electronic notebook 18 while the control unit 223 is set in the read/communication mode and the image sensor 222 is activated by the image sensor driving unit 224, the electronic notebook 18 is coupled to the serial transmitting/receiving unit 51 via the coupling cord 19 to start data transmission. As a result, the data received by the unit 51 is supplied to the control unit 223 via the selector 226, and data reception performed as in the first embodiment.

In addition, printing by the copier 210 is performed by the operation as in the first embodiment.

Since the copier 210 includes the reading section 211 for reading image data, image data read by the reading section 211 and image data (character pattern) transferred from the electronic notebook 18 can be synthesized and printed.

Figure 18A:
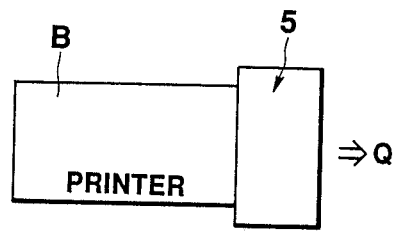
FIGS. 18A and 18B are views showing states in which printing is performed by using the copier shown in FIG. 16.
Figure 18B:
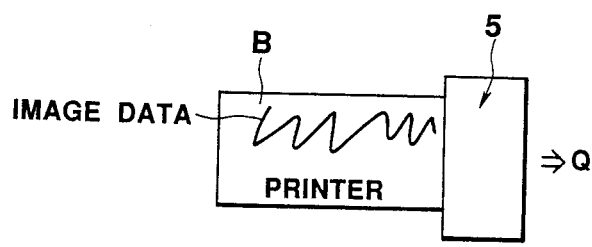

That is, when image data "PRINTER" is transferred from the notebook 18 to the copier 210, assume that the data is written in the 6th to 8th bytes in the column (X) direction of the image data memory unit 53 and that image data read by the reading section 211 is stored beforehand in the 1st to 5th bytes in the column (X) direction of the memory unit 53. In this case, if the control flag is "1" in step B4 shown in FIG. 8, only the received data "PRINTER" is printed out on the recording paper A, as shown in FIG. 18A. If the control flag is "0", the received data "PRINTER" is printed out on the recording paper A together with the image data read by the image sensor 222, as shown in FIG. 18B.

What is claimed is:

1. A printing apparatus which prints data received from a peripheral apparatus, said printing apparatus comprising:

housing means which is manually sweepable across a printing medium;

coupling means for detachably coupling with said peripheral apparatus;

data receiving means provided in said housing means, for receiving data from said peripheral apparatus via said coupling means;

memory means provided in said housing means, for storing the data received by said receiving means;

printing means carried by said housing, for printing the data stored in said memory means on said printing medium positioned outside of said housing means, when said housing means is manually swept across said printing medium;

position-detecting means for detecting a position of said printing medium as said housing means is manually swept across said printing medium, and for producing position-detecting signals every time said housing means is swept over a predetermined distance, said position-detecting signals responding the position of said housing means with respect to said printing medium; and control means provided in said housing means, for outputting the data from said memory means and for causing said printing means to print the data output from said memory means on said printing medium in response to said position-detecting signals output from said position-detecting means.

2. The printing apparatus according to claim 1, further comprising:

detecting means provided in said housing means, for detecting printing data and control data from said data received by said receiving means, wherein said memory means includes:

first area for storing said printing data detected by said detecting means; and second area for storing said control data detected by said detecting means; and said control means includes:

print control means for controlling said printing means based on said control data stored in said second area of said memory means.

3. The printing apparatus according to claim 2, wherein said detecting means detects designating data for designating the printing size of said printing data, and said print control means includes:

printing size changing means for changing the printing size of said printing data stored in said first area of said memory means, corresponding to said designating data detected by said detecting means.

4. The printing apparatus according to claim 2, wherein said detecting means detects segment data for segmenting said printing data, and
said print control means includes:
output control means for outputting said printing data from said first area of said memory means and for supplying said printing data output from said first area, according to said segment data detected by said detecting means.

5. The printing apparatus according to claim 1, further comprising:
detecting means provided in said housing means, for detecting printing data and control data from said data received by said receiving means; and
memory control means provided in said housing means, for controlling write-operation of said memory means and for writing said printing data detected by said detecting means into said memory means according to said control data detected by said detecting means.

6. The printing apparatus according to claim 5, wherein said detecting means detects repeat number data, and
said memory control means writes said printing data repeatedly, according to said repeat number data detected by said detecting means.

7. The printing apparatus according to claim 1, further comprising:
power-supplying means provided in said housing means, for supplying electric power to at least said printing means; and
recharging means for receiving electric power from said peripheral apparatus and for recharging said power-supplying means with said electric power received from said peripheral apparatus.

8. The printing apparatus according to claim 7, further comprising:
voltage-detecting means provided in said housing means, for detecting voltage-value of the electric power of said power-supplying means; and
requiring means provided in said housing means, for requiring said peripheral apparatus to supply electric power to said printing apparatus, so as to recharge said power-supplying means with said electric power when said voltage-detecting means detects that said voltage-value of the output power of said power-supplying means is less than predetermined voltage-value.

9. The printing apparatus according to claim 1, wherein said housing means is capable of being detachably mounted on said peripheral apparatus, and
said coupling means includes:
connecting means for connecting said receiving means with said peripheral apparatus, when said housing means is mounted on said peripheral apparatus.

10. The printing apparatus according to claim 1, further comprising:
image data input means carried by said housing means, for inputting image data from a material having an image data, while said housing means is manually swept across said material; and
memory control means provided in said housing means, for writing said image data input by said image data input means into said memory means.

11. The printing apparatus according to claim 10, wherein said memory control means includes:
write control means for writing said data received by said receiving means into one part of said memory means and for remaining said image data stored in another part of said memory means.

12. The printing apparatus according to claim 11, wherein said control means includes:
first output means for outputting only said data stored in one part of said memory mean to said printing means;
second output means for outputting both said data stored in one part of said memory means and said image data stored in another part of said memory means to said printing means; and
select means for selecting one of said first output means and second output means to be activated.

13. The printing apparatus according to claim 11, further comprising:
detecting means provided in said housing means, for detecting printing data and control data from said data received by said receiving means,
wherein said write control means writes said printing data detected by said detecting means into one part of said memory means, said one part according to said control data detected by said detecting means.

14. The printing apparatus according to claim 13, wherein said memory means includes:
control data storage means for storing said control data detected by said detecting means, and
said control means includes:
output means for outputting said data stored in one part of said memory means according to said control data stored in said control data storage means.

15. A printing system comprising:
data source apparatus having;
data input means for inputting data;
data storage means for storing said data input from said data input means; and
data sending means for sending said data stored in said data storage means; and
printing apparatus having;
housing means which is manually sweepable across a printing medium;
data receiving means provided in said housing means, for receiving said data sent by said data sending means;
memory means provided in said housing means, for storing said data received by said data receiving means;
printing means carried by said housing means, for printing said data stored in said memory means, when said housing means is manually swept across said printing medium;
position-detecting means for detecting a position of said printing medium as said housing means is manually swept across said printing medium, and for producing position-detecting signals every time said housing means is swept over a predetermined distance, said position-detecting signals responding the position of said housing means with respect to said printing medium; and
control means provided in said housing means, for outputting said data from said memory means to said printing means and for causing said printing means to print said data output from said memory means on said printing medium in response to said position-detecting signals output from said position-detecting means.

16. The printing system according to claim 15, wherein said data source apparatus further includes:
   fixing means for detachably mounting said said printing apparatus, and
   first connecting means coupled to said data sending means, for electrically connecting with said printing apparatus; and
   said printing apparatus further includes:
   second connecting means coupled to said data receiving means, for connecting with said first connecting means when said printing apparatus has been mounted to said fixing means.

17. The printing system according to claim 15, wherein said data source apparatus further includes:
   power source means for supplying electric power; and
   first connecting means coupled to said data sending means and power source means, for electrically connecting with said printing apparatus; and
   said printing apparatus further includes:
   second connecting means for connecting with said first connecting means;
   power-supplying means for supplying electric power to at least said printing means; and
   coupling means for coupling said second connecting means and said power-supplying means, so as to recharge said power-supplying means with electric power supplying from said power source means via said first and second connecting means.

18. The printing system according to claim 17, wherein said printing apparatus further includes:
   voltage-detecting means for detecting voltage-value of the electric power of said power-supplying means; and
   requiring means for requiring to recharge said electric power with said power-supplying means when said voltage-detecting means detects that said voltage-value of said power-supplying means is less than predetermined voltage-value; and
   said data source apparatus further includes:
   recharging means for producing rechargable electric power from said electric power supplied from said power source means and for supplying said rechargable electric power to said power-supply means, when said requiring means requires said electric power with said power-supplying means.

* * * * *